(12) United States Patent
Ehrlich

(10) Patent No.: US 7,775,188 B2
(45) Date of Patent: Aug. 17, 2010

(54) PLASMA PLUG FOR AN INTERNAL COMBUSTION ENGINE

(76) Inventor: Melvin Ehrlich, 51 The Intervale, Roslyn, NY (US) 11576

( * ) Notice: Subject to any disclaimer, the term of this patent is extended or adjusted under 35 U.S.C. 154(b) by 0 days.

(21) Appl. No.: 12/378,915

(22) Filed: Feb. 20, 2009

(65) Prior Publication Data

US 2009/0223474 A1   Sep. 10, 2009

Related U.S. Application Data

(60) Provisional application No. 61/066,737, filed on Feb. 22, 2008.

(51) Int. Cl.
*F02P 23/00* (2006.01)
*H01T 13/02* (2006.01)

(52) U.S. Cl. .............. 123/143 B; 123/169 PA

(58) Field of Classification Search ............ 123/143 B, 123/169 PA, 605, 608, 618, 635, 169 EL
See application file for complete search history.

(56) References Cited

U.S. PATENT DOCUMENTS

| | | | |
|---|---|---|---|
| 4,511,524 A | 4/1985 | Nemeth et al. ............... 264/61 |
| 4,549,114 A | 10/1985 | Herden ....................... 315/58 |
| 5,371,436 A * | 12/1994 | Griswold et al. ............ 315/58 |
| 6,111,345 A | 8/2000 | Shibata et al. ............. 313/141 |
| 6,131,542 A * | 10/2000 | Suckewer et al. ........ 123/143 B |
| 6,321,733 B1 * | 11/2001 | Suckewer et al. ........... 123/620 |
| 6,553,981 B1 | 4/2003 | Suckewer et al. ........... 123/620 |
| 7,328,677 B2 * | 2/2008 | Hagiwara et al. ....... 123/143 B |
| 7,387,115 B1 * | 6/2008 | Katoh et al. ................. 123/620 |

OTHER PUBLICATIONS

Notification of Transmittal of the International Search Report and the Written Opinion of the Searching Authority, or the Declaration.
International Search Report.
Written Opinion of the International Searching Authority.

\* cited by examiner

*Primary Examiner*—Hai H Huynh
(74) *Attorney, Agent, or Firm*—Gerald T. Bodner

(57) ABSTRACT

A plasma plug for an internal combustion engine includes a main body having an inner portion formed of ceramic and an outer portion formed of aluminum or other metal. A first electrode and a second electrode formed of Ruthenium dioxide are disposed axially within the electrically insulated portion of the main body. The plasma plug further includes a donut shaped toroidal capacitor situated circumferentially about the main body of the plasma plug, having an open center, an outer plate connected to a high voltage, direct current generator, an inner plate selectively connected to the first electrode through a spark switch and a dielectric situated between the outer plate and the inner plate. A resistive element connected in series to the first electrode and the second electrode is situated at the lower portion of the main body. The second electrode is either grounded or can float above ground to complete the circuit.

16 Claims, 5 Drawing Sheets

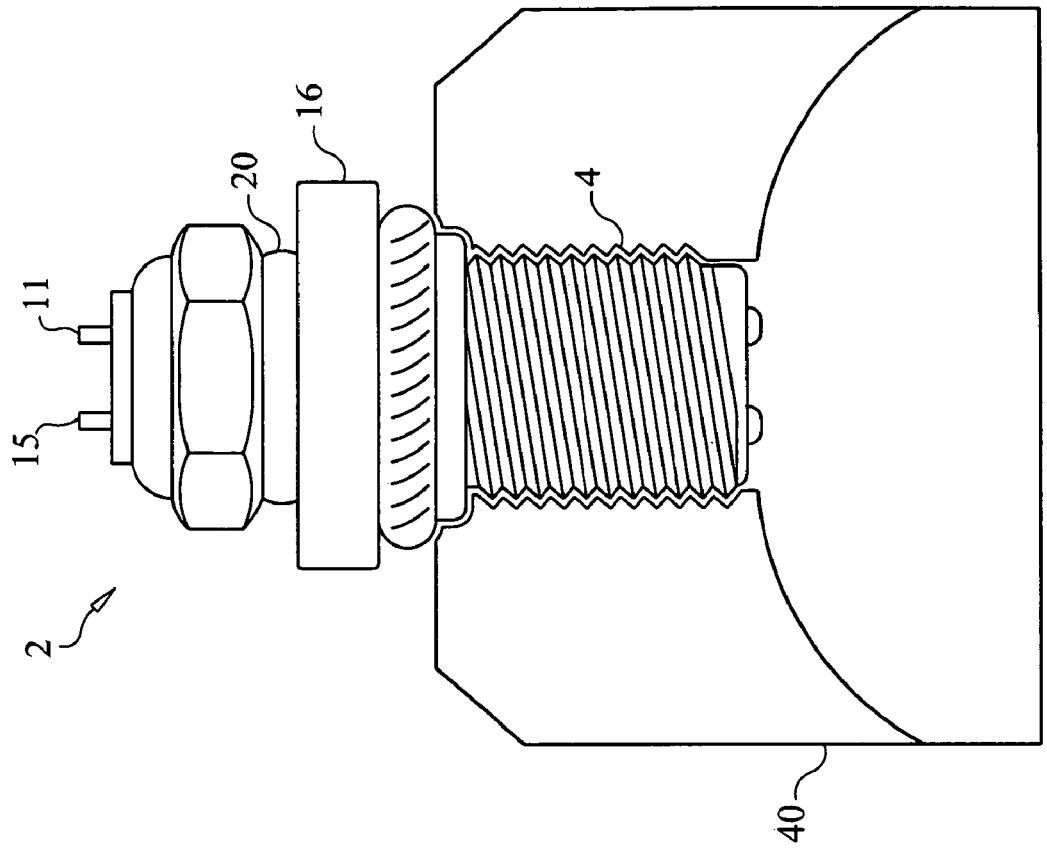
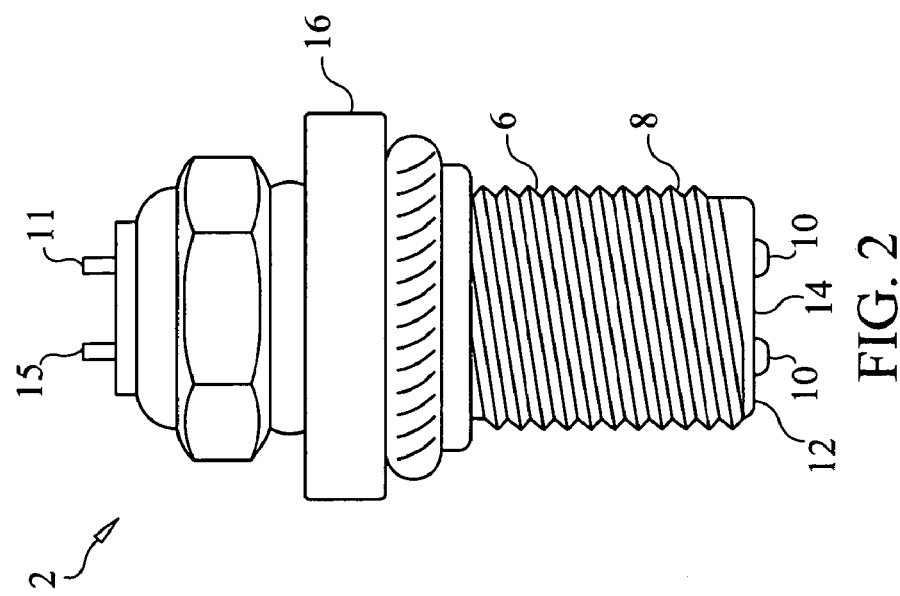

PLASMA PLUG FOR AN INTERNAL COMBUSTION ENGINE

CROSS-REFERENCE TO RELATED APPLICATION

This application is related to U.S. Provisional Application Ser. No. 61/066,737, filed on Feb. 22, 2008, and entitled "Plasma Plug for an Internal Combustion Engine", the disclosure of which is incorporated herein by reference. This application claims the benefit of priority under 35 U.S.C. 119 and/or 35 U.S.C. 120 to the aforementioned related provisional application.

BACKGROUND OF THE INVENTION

1. Field of the Invention

This invention generally relates to ignition systems for internal combustion engines and more specifically relates to plasma ignition systems.

2. Description of the Prior Art

Conventionally, internal combustion engines, typically diesel or gas, utilize either a spark assisted ignition system, compression method or glow plug to ignite their specific fuel. In the case of diesel engines, the movement of the piston within the cylinder creates an extremely high pressure and temperature that in turn ignites the fuel, which is injected into the cylinder. To generate such a pressure, a significant compression ratio is needed.

It has been studied that once the piston moves roughly one third of its length of travel within the cylinder, after firing just past TDC (top dead center), the combustion process ends due to a flame out of the ignited fuel. As a result, the partially combusted remaining fuel and byproducts present within the cylinder are pushed out through the exhaust of the engine, contributing to poor fuel economy and environmental pollution. This problem is further enhanced by changing engine speeds, especially during gear shifts.

In gasoline engines, a spark generated by a conventional spark plug 1, as shown in FIG. 1, within a cylinder ignites the fuel air mixture therein. As in diesel engines, the adiabatic compression and shock wave created in the cylinder seldom ignites the entire fuel air mixture present in the cylinder and results in the expulsion of partially combusted fuel and byproducts.

The underlying problem in both diesel and gasoline internal combustion engines is that the conventional methods of igniting the fuel air mixture in the cylinder does not generate enough energy or propagate fast enough to ignite the entire contents of the cylinder. If the entire cylinder contents were ignited, just after TDC, engine performance would increase significantly and decrease the pollutants exhausted.

The present invention provides a plasma ignition system for internal combustion engines capable of generating enough energy to ignite the vast majority of the fuel air mixture within a cylinder, increasing engine performance and overcoming the inherent disadvantages found in the conventional combustion engines.

OBJECTS AND SUMMARY OF THE INVENTION

It is an object of the present invention to provide a plasma ignition system for internal combustion engines.

It is another object of the present invention to provide a plasma ignition system for internal combustion engines capable of generating enough energy to ignite the vast majority of the fuel air mixture within a cylinder of an internal combustion engine independent of engine speed.

It is a further object of the present invention to provide a plasma ignition system for internal combustion engines that increases engine performance and decreases pollution.

It is still a further object of the present invention to provide a plasma ignition system for internal combustion engines that overcomes the inherent disadvantages found in conventional internal combustion engines.

It is yet a further object of the present invention to provide a plasma plug for forming and creating a plasmoid within a combustion chamber of an internal combustion engine. A Plasmoid is a rapidly moving bundle of ionized gas, created by an arc between two electrodes and its associated magnetic field.

The plasma plug for an internal combustion engine formed in accordance with the present invention includes a main body having an inner portion and an outer portion. The inner portion of the main body is preferably formed of an electrically insulated material. The outer portion of the main body, or at least a portion thereof, is preferably formed of an electrically conductive material, such as aluminum, steel, stainless steel, iron or the like. A first electrode and a second electrode are disposed axially within the electrically insulated portion of the main body.

The plasma plug further includes a toroidal capacitor. The toroidal capacitor preferably has a donut shape and defines an open center. The toroidal capacitor is situated circumferentially about the main portion of the plasma plug. The toroidal capacitor has an outer plate, inner plate and dielectric, the dielectric being situated between the outer plate and the inner plate. The outer plate (alternatively, the inner plate) is electrically connected to a high voltage, direct current (DC) generator. The inner plate (alternatively, the outer plate) is electrically connected to the first electrode (alternatively, the second electrode). The second electrode (alternatively, the first electrode) is grounded.

A resistive element is situated at the lower portion of the main body. The resistive element is connected in series to and between the first electrode and the second electrode.

These and other objects, features and advantages of the present invention will be apparent from the following detailed description of illustrative embodiments thereof, which is to be read in connection with the accompanying drawings.

BRIEF DESCRIPTION OF THE DRAWINGS

FIG. 2 is a side view of the plasma plug used in a plasma ignition system formed in accordance with a first embodiment of the present invention.

FIG. 3 is a side view of the plasma plug used in a plasma ignition system formed in accordance with a first embodiment of the present invention, situated partially within a cylinder of an internal combustion engine, shown in partial cross-section.

DETAILED DESCRIPTION OF THE PREFERRED EMBODIMENTS

Figure 1:
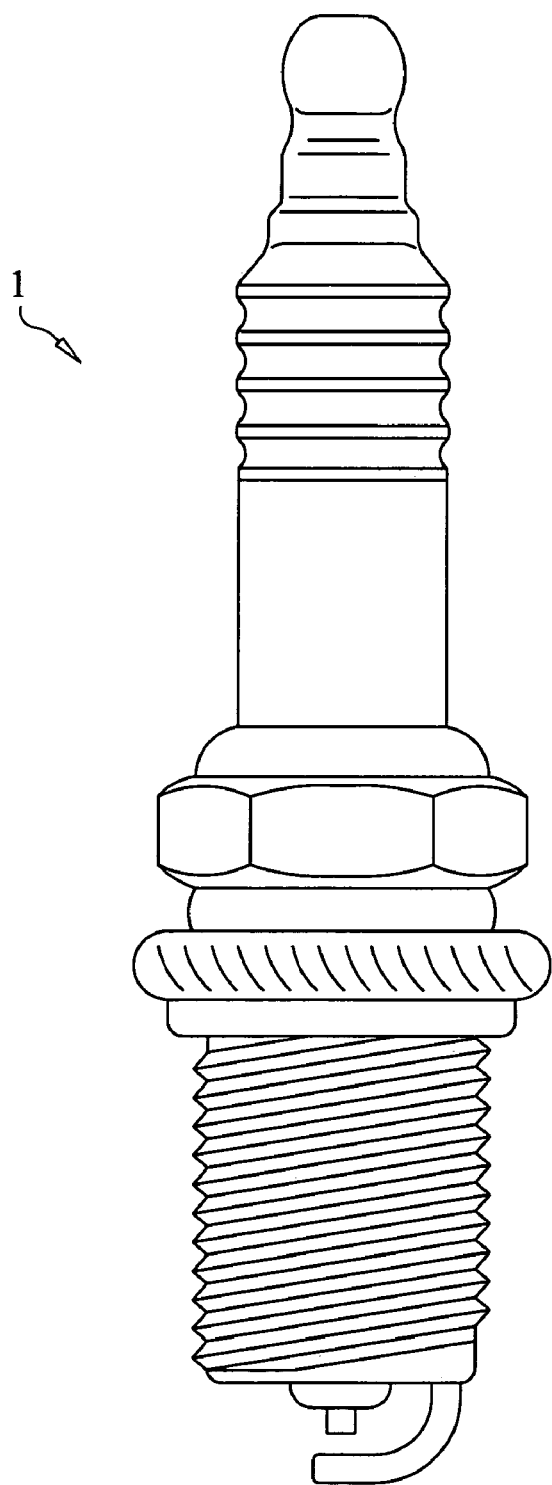
FIG. 1 is a side view of a conventional spark plug.

In a first embodiment of the present invention, shown in FIGS. 2-5, a plasma ignition system includes a plasma plug 2 which is threadingly received by the conventional spark plug bore 4 of a non-Diesel internal combustion engine 40.

The plasma plug 2 includes a main body 6 preferably constructed of a ceramic or ceramic-like electrically insulative material 48. A lower portion 8 of the main body is preferably formed of an electrically conductive and relatively strong material (e.g., aluminum, steel or the like) surrounding the ceramic of the plug, and is externally threaded and received by a conventional threaded spark plug bore 4. Alternatively, the threaded lower portion 8 may be formed of an electrically non-conductive material, such as ceramic. Internally, within the lower portion 8 of the main body and extending longitudinally within the main body 6 are two electrodes 10 which pass through the interior ceramic of the plug. The electrodes 10, consisting of a first electrode 7 and a second electrode 5, preferably extend parallel to one another along the axial length of the plasma plug 2 and are separated by several millimeters. At a bottom end 12 of the main body 6, the electrodes 10 exit the plug 2 and are connected together by a highly electrically resistive material, preferably a carbon film 14. As can be seen in FIG. 5, the resistive film 14 is preferably formed as a thin, narrow strip extending between and contacting the two electrodes 10. The purpose of the thin strip of carbon film 14 is to provide a conductive path to initiate an arc between the electrodes, rather than a spark.

At a top end 17 of the main body 6, a first exposed electrical contact 15 and a second exposed electrical contact 11 exit the plug 2 and are respectively connected directly or via a wire 30, 31 or the like to the first electrode 7 and second electrode 5. One or more high voltage toroidal capacitors 16, each of which is donut shaped and has an open center 18, is fitted around an upper portion 20 of the main body 6. The toroidal capacitor 16 has an outer plate 19, an inner plate 21 and a dielectric 23 situated between the outer plate 19 and the inner plate 21. One of the electrodes (such as the first electrode 7) is connected to a spark switch 25 via one of the contacts (such as the first contact 15) which is in electrical communication with one of the plates of the capacitor 16 (such as the inner plate 21). The other of the electrodes (such as the second electrode 5) is connected to ground potential via the other contact (such as the second contact 11). The capacitance of capacitor 16 is chosen such that it is capable of storing sufficient energy to "fire" the plasma plug 2, creating an "arc". The capacitor 16 may also be connected to the conventional auto ignition system for firing. The charging of the capacitor 16 will be by a DC high voltage generator 27 in electrical communication with the other of the plates of the capacitor 16 (such as the outer plate 19), which generator 27 provides a high voltage, direct current (DC) signal to the plate of the capacitor 16 to which it is connected.

If more than one toroidal capacitor 16 is used and mounted on the plasma plug 2, received through the central openings of the capacitors 16, the capacitors may be connected together in parallel to increase the overall capacitance provided by the toroidal capacitors, or may be connected together in series to decrease the overall capacitance, or some of the capacitors 16 may be connected in parallel and some connected in series. Also, although the use of one or more toroidal capacitors 16 is preferred, it is envisioned to be within the scope of the present invention to use one or more non-toroidal type, high voltage capacitors.

Figure 4A:
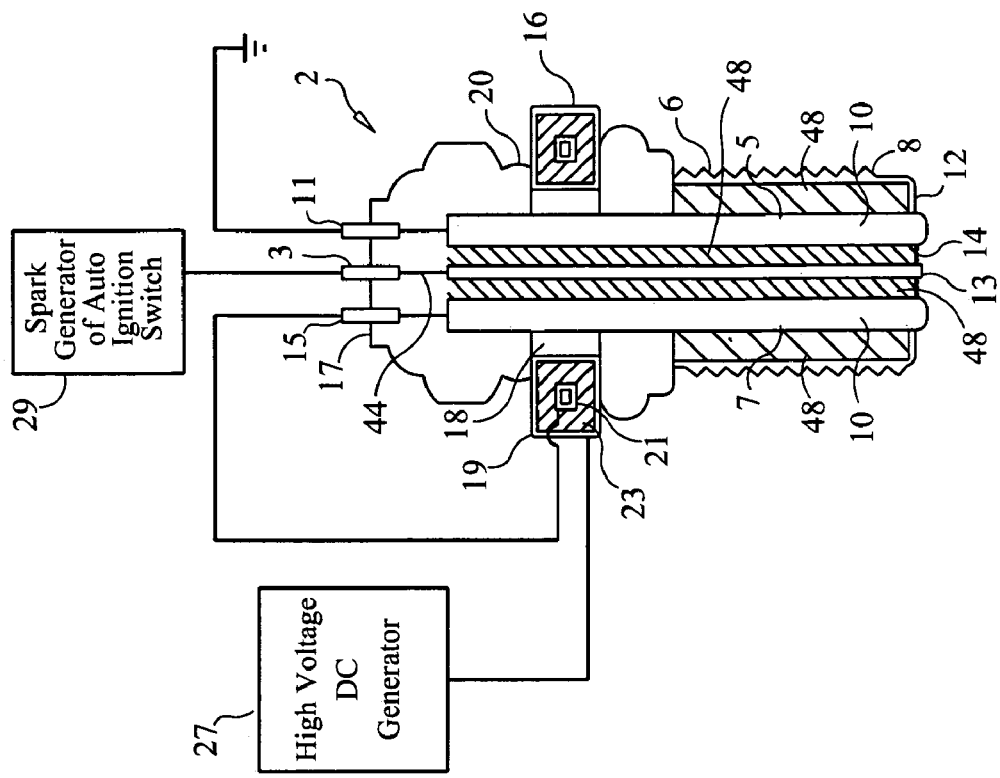
FIG. 4A is a longitudinal cross-sectional view of the plasma plug and plasma ignition system formed in accordance with a second embodiment of the present invention.
Figure 4:
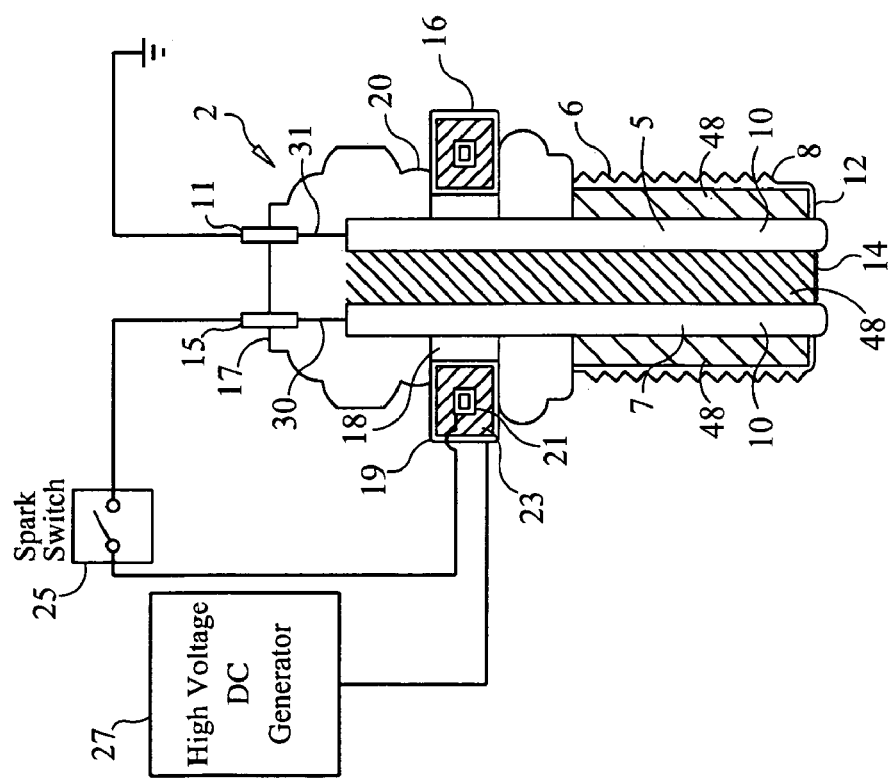
FIG. 4 is a longitudinal cross-sectional view of the plasma plug and plasma ignition system formed in accordance with a first embodiment of the present invention.
Figure 5A:
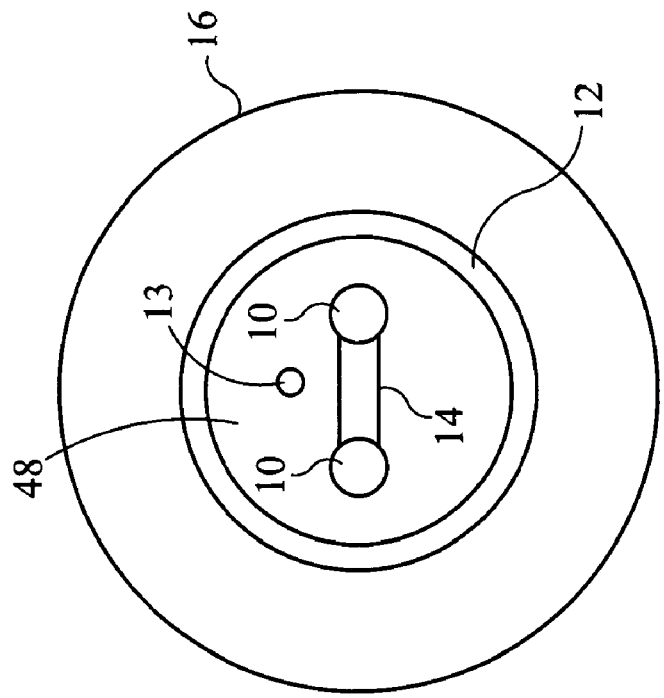
FIG. 5A is a bottom view of the plasma plug used in the plasma ignition system formed in accordance with the second embodiment of the present invention and shown in FIG. 4A.
Figure 5:
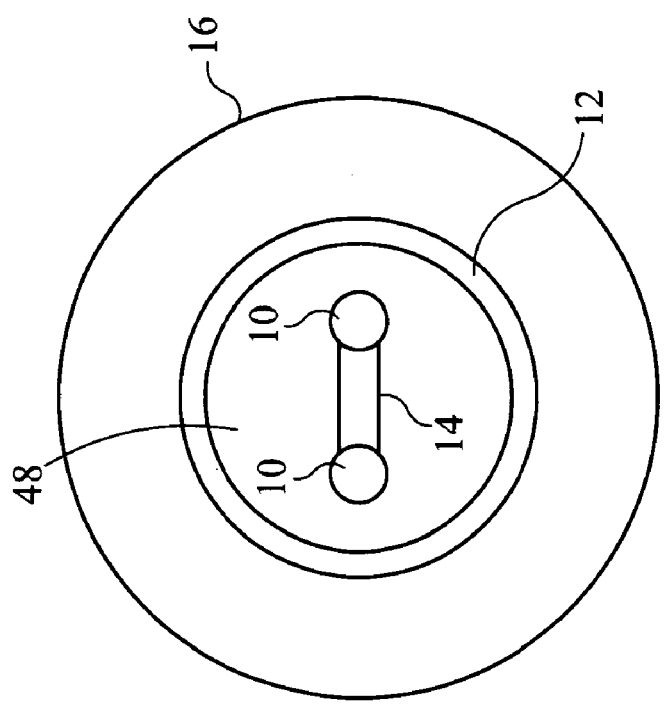
FIG. 5 is a bottom view of the plasma plug used in the plasma ignition system formed in accordance with the first embodiment of the present invention and shown in FIG. 4.

In a second embodiment of the present invention, shown in FIGS. 4A and 5A, the plasma plug 2, having the configuration shown in FIG. 4, may further include a "trigger" electrode 13, which passes longitudinally through the ceramic interior of the plug. The trigger electrode 13 preferably extends along the axial length of the plug 2 and exits the plug 2 at the bottom end 12. The trigger electrode 13 is in electrical communication with a spark generator 29 of a conventional auto ignition system via an exposed electrical contact 3 situated on the top surface of the plasma plug, the trigger electrode 13 being connected to the exposed electrical contact 3 directly or by a wire 44 or the like. In this embodiment, the spark switch 25 shown in FIG. 4 is unnecessary, as the spark to ignite the fuel/air mixture is provided by the trigger electrode 13. Accordingly, with the spark switch 25 omitted, one of the electrodes (such as the first electrode 7) is connected directly to one of the plates of the capacitor 16 (such as the inner plate 21).

As can be seen in FIG. 5A, the exposed portion of the trigger electrode 13 at the bottom end of the plasma plug 2 is preferably situated equidistantly from the electrodes 10 and out of alignment therewith (i.e., not situated directly between the electrodes 10) so that the trigger electrode 13 does not interfere with the resistive film 14 extending between the electrodes 10, but is preferably situated close enough to the electrodes 10 and the resistive film 14 to ignite the fuel/air mixture in proximity to the area of the resistive film 14 situated between the electrodes 10 from where a plasma arc emanates.

During operation, the toroidal capacitor 16 is charged by a High Voltage DC power supply. Once the system determines a proper firing time, the stored energy within the capacitor 16 provides current between the electrodes 10, and a plasma arc is generated at the bottom end 12 of the main body 6. Depending on the specific geometry of the electrodes 10 in the plasma plug 2, the burst of plasma generated by the released current flow will take on certain geometries and is referred to as a plasmoid. The plasma ("plasmoid") generated by the plug typically possesses an electron temperature of about 5-50 ev (electron volts) (1 ev is about 11,331° C.), and is in the form of a fluidly moving ionized gas. As such, the movement and shape of the plasma generally follows the law of hydrodynamics.

As the plasmoid is generated at the bottom end 12 of the plug 2, the current flow creates a significant magnetic field around it, which propels the plasmoid away from the bottom 12 of the plug 2 and into the cylinder. The overall size and geometry of the plasmoid ions rapidly expand and fill the entire cylinder chamber. A shock wave effect is created within the cylinder which further increases the temperature of the plasmoid ions.

The rapidly expanding plasmoid ions have the ability to fill the entire cylinder chamber, combusting its entire contents.

As mentioned previously, conventional ignition systems of internal combustion engines must specifically and precisely create an air to fuel mixture that promotes the most efficient combustion within the chamber for a given RPM (revolutions per minute). The plasma ignition of the present invention has the ability to substantially completely combust all contents, allowing increased efficiency and decreased pollution.

Figure 7:
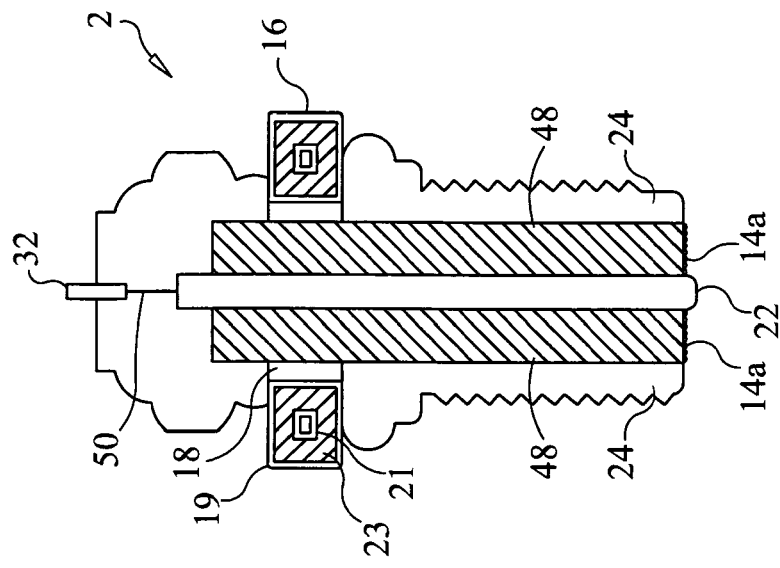
FIG. 7 is a longitudinal cross-sectional view of the plasma plug used in the plasma ignition system formed in accordance with the third embodiment of the present invention and shown in FIG. 6.
Figure 8:
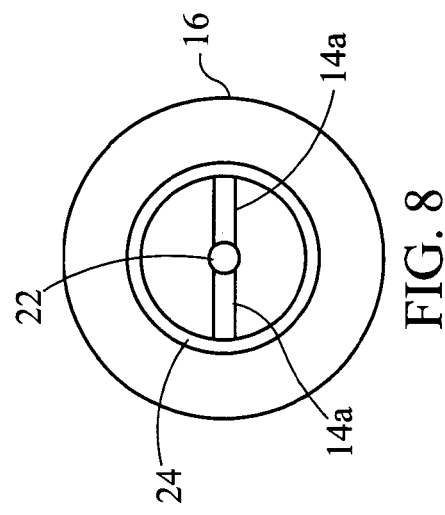
FIG. 8 is a bottom view of the plasma plug used in the plasma ignition system formed in accordance with the third embodiment of the present invention and shown in FIG. 7.
Figure 6:
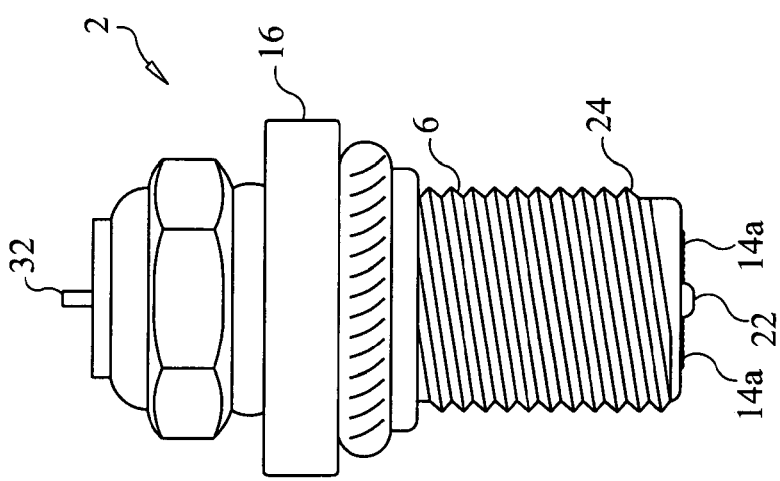
FIG. 6 is a side view of the plasma plug used in the plasma ignition system formed in accordance with a third embodiment of the present invention.

In a third embodiment of the present invention, shown in FIGS. 6-8, the plasma plug 2 may include a single electrode 22 extending longitudinally within the ceramic main body 6. The electrode 22 is connected directly or via a wire 50 or the like to an exposed electrical contact 32 on the top surface of the plasma plug 2. The threaded outer wall 24 of the main body 6 may be formed of a conductive material, such as metal, and is grounded. The single electrode 22 exiting the bottom portion 12 of the plug 2 may be connected to the outer wall, grounded electrode 24 by a highly resistive material 14, such as carbon film, formed as one or more strips 14a extending radially from the center electrode 22 to the outer electrode 24, as shown in FIG. 8. One plate (for example, the inner plate 21) of the toroidal capacitor 16 is connected to the inner electrode 22 through a spark switch 25, such as shown in FIG. 4, while the other plate (for example, the outer plate 19) of the toroidal capacitor 16 is connected to a high voltage, DC generator or source 27, such as shown in FIG. 4. The plug 2 is fired as in the previous embodiment shown in FIG. 4 and forms a donut shaped or spherical plasmoid that is rapidly propelled away from the plug into the cylinder from the magnetic force created by the current flow between the electrode 22 and outer wall grounded electrode 24 through the ionized plasma.

In yet another embodiment of the present invention, the plasma plug 2 may be formed to contribute additional oxygen atoms by utilizing electrodes 10, 22 constructed of Ruthenium dioxide. As the current flows through the Ruthenium dioxide, oxygen atoms (ions) are released from the exposed portions of the electrodes 10, 22 into the fuel/air mixture within the engine cylinder, further energizing and creating the plasmoid ions. Other electrode materials may be used to provide ions, which will enhance the combustion process, reduce cylinder wear and provide other benefits.

It should be realized that the plasma plug 2 of the present invention could be installed in diesel combustion engines, as well as gas combustion engines, and such an application is envisioned to be within the scope of the present invention.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A plasma plug for an internal combustion engine, which comprises:
    a main body having an inner portion formed of an electrically insulated material and an outer portion disposed radially outwardly of the inner portion, at least one portion of the outer portion being formed of an electrically conductive material, the main body further having an upper portion and a lower portion disposed axially opposite the upper portion, the lower portion further including a bottom surface;
    a first electrode and a second electrode disposed axially within the electrically insulated inner portion of the main body and spaced apart from each other, the second to electrode being electrically connectable to ground or floating, to complete the circuit;
    at least one capacitor having a first plate, a second plate and a dielectric situated between the first plate and the second plate, the first plate being in electrical communication with the first electrode, the second plate being electrically connectable to a high voltage source; and
    a resistive element, the resistive element being situated at the lower portion of the main body and being electrically connected in series with the first electrode and the second electrode.

2. A plasma plug as defined by claim 1, wherein the inner portion of the main body is formed of a ceramic material.

3. A plasma plug as defined by claim 1, wherein the at least one portion of the outer portion of the main body is formed from a metal.

4. A plasma plug as defined by claim 1, wherein at least one of the first electrode and the second electrode is formed of Ruthenium dioxide.

5. A plasma plug as defined by claim 1, wherein the resistive element is formed of carbon film, the carbon film being formed on the bottom surface of the lower portion of the main body.

6. A plasma plug as defined by claim 1, which further comprises:
    a trigger electrode, the trigger electrode being disposed axially within the electrically insulated inner portion of the main body and situated in proximity to the first electrode, the second electrode and the resistive element, the trigger electrode being electrically connectable to a spark generator.

7. A plasma ignition system for use with an internal combustion engine, which comprises:
    a plasma plug as defined by claim 6;
    a high voltage, direct current generator, the high voltage, direct current generator being in electrical communication with the first plate of the at least one capacitor and providing a high voltage, direct current signal thereto, the second plate of the at least one capacitor being in electrical communication with the first electrode of the plasma plug, the second electrode of the plasma plug being in electrical communication with a ground potential or floating, to complete the circuit; and
    a spark generator, the spark generator being in electrical communication with the trigger electrode of the plasma plug.

8. A plasma plug as defined by claim 1, wherein the at least one capacitor is a toroidal capacitor, the toroidal capacitor having a donut shape and defining an open center, the toroidal capacitor being situated circumferentially about the main body.

9. A plasma ignition system for use with an internal combustion engine, which comprises:
    a plasma plug as defined by claim 1;
    a high voltage, direct current generator, the high voltage, direct current generator being in electrical communication with the first plate of the at least one capacitor and providing a high voltage, direct current signal thereto; and
    a spark switch, the spark switch being in electrical communication with the second plate of the at least one capacitor and further being in electrical communication with the first electrode of the plasma plug, the second electrode of the plasma plug being in electrical communication with a ground potential or floating, to complete the circuit.

10. A plasma plug for an internal combustion engine, which comprises:

a main body having an inner portion formed of an electrically insulated material and an outer portion disposed radially outwardly of the inner portion, at least one portion of the outer portion being formed of an electrically conductive material, the main body further having an upper portion and a lower portion disposed axially opposite the upper portion, the lower portion further including a bottom surface;

a center electrode, the center electrode being disposed axially within the electrically insulated portion of the main body;

an outer electrode, the outer electrode being defined by the electrically conductive at least one portion of the outer portion of the main body, the outer electrode being electrically connectable to ground or floating, to complete the circuit;

at least one capacitor, the at least one capacitor having a first plate, a second plate and a dielectric situated between the first plate and the second plate, the first plate being in electrical communication with the center electrode, the second plate being electrically connectable to a high voltage source; and a resistive element, the resistive element being situated at the lower portion of the main body and being electrically connected in series with the center electrode and the outer electrode.

11. A plasma plug as defined by claim 10, wherein the inner portion of the main body is formed of a ceramic material.

12. A plasma plug as defined by claim 10, wherein the at least one portion of the outer portion of the main body is formed from a metal.

13. A plasma plug as defined by claim 10, wherein the center electrode is formed of Ruthenium dioxide.

14. A plasma plug as defined by claim 10, wherein the resistive element is formed as a strip extending radially from the center electrode to the outer electrode.

15. A plasma plug as defined by claim 10, wherein the at least one capacitor is a toroidal capacitor, the toroidal capacitor having a donut shape and defining an open center, the toroidal capacitor being situated circumferentially about the main body.

16. A plasma ignition system for use with an internal combustion engine, which comprises:

a plasma plug as defined by claim 10;

a high voltage, direct current generator, the high voltage, direct current generator being in electrical communication with the first plate of the at least one capacitor and providing a high voltage, direct current signal thereto; and a spark switch, the spark switch being in electrical communication with the second plate of the at least one capacitor and further being in electrical communication with the center electrode of the plasma plug, the outer electrode of the plasma plug being in electrical communication with a ground potential or floating, to complete the circuit.

* * * * *